US012743067B2

(12) United States Patent
Koch et al.

(10) Patent No.: US 12,743,067 B2
(45) Date of Patent: Sep. 22, 2026

(54) METHOD AND SYSTEM FOR PROVIDING DATA FOR AT LEAST ONE DATA RECEIVER

(71) Applicant: Volkswagen Aktiengesellschaft, Wolfsburg (DE)

(72) Inventors: Roman Koch, Braunschweig (DE); Karl-Dieter Zimmer-Bentin, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 905 days.

(21) Appl. No.: 17/311,100

(22) PCT Filed: Nov. 8, 2019

(86) PCT No.: PCT/EP2019/080715
§ 371 (c)(1),
(2) Date: Jun. 4, 2021

(87) PCT Pub. No.: WO2020/114712
PCT Pub. Date: Jun. 11, 2020

(65) Prior Publication Data

US 2021/0333773 A1 Oct. 28, 2021

(30) Foreign Application Priority Data

Dec. 5, 2018 (DE) ..................... 10 2018 220 993.6

(51) Int. Cl.
*G06F 9/445* (2018.01)
*G05B 19/042* (2006.01)

(52) U.S. Cl.
CPC ..... *G05B 19/0423* (2013.01); *G05B 19/0426* (2013.01); *G06F 9/44505* (2013.01);
(Continued)

(58) Field of Classification Search
CPC ............ G05B 19/0423; G05B 19/0426; G05B 2219/25124; G05B 2219/2637; G06F 9/44505
See application file for complete search history.

(56) References Cited

U.S. PATENT DOCUMENTS 8,560,128 B2 10/2013 Ruff et al. .................... 700/278
2004/0138840 A1 7/2004 Wolfe ............................ 702/81
(Continued)

FOREIGN PATENT DOCUMENTS

CN 102598584 A 7/2012 ............. H04L 12/16
CN 102780923 A 11/2012 ........... H04N 21/262
(Continued)

OTHER PUBLICATIONS

International Search Report and Written Opinion, Application No. PCT/EP2019/080715, 25 pages, Jan. 27, 2020.
(Continued)

*Primary Examiner* — Kamini S Shah
(74) *Attorney, Agent, or Firm* — Slayden Grubert Beard PLLC

(57) ABSTRACT

The invention relates to a method for providing data for at least one data receiver, the data being generated by at least one function of a data provision device, which at least one function can be configured on the basis of at least one configuration parameter, the method comprising the following steps: creating a configuration for the at least one function by specifying the at least one configuration parameter by a configuration device of a backend server, transmitting the created configuration to the data provision device by an interface of the backend server, receiving the configuration by an interface of the data provision device, configuring the at least one function on the basis of the received configuration, delivering the data generated by the config-
(Continued)

ured at least one function via the interface of the data provision device.

10 Claims, 2 Drawing Sheets

(52) U.S. Cl.
CPC .............. *G05B 2219/25124* (2013.01); *G05B 2219/2637* (2013.01)

(56) References Cited

U.S. PATENT DOCUMENTS

2007/0165865 A1 7/2007 Talvitie .......................... 380/286
2008/0096507 A1 4/2008 Erola et al. ................ 455/187.1
2009/0276486 A1 11/2009 Tandon et al. ................ 709/203
2011/0093568 A1 4/2011 Thomas ......................... 709/219
2012/0239335 A1* 9/2012 Lachapelle .......... G05B 19/042 702/85
2012/0291071 A1 11/2012 Seo et al. ........................ 725/41
2013/0080411 A1* 3/2013 Rolia ................... G06Q 10/101 707/694
2013/0211547 A1 8/2013 Buchdunger et al. .......... 700/11
2015/0310182 A1 10/2015 Henze et al. ..................... 705/3
2016/0021509 A1* 1/2016 Meier ..................... H04W 4/40 455/456.2
2016/0110243 A1 4/2016 Domke et al. .................. 714/37
2016/0274552 A1* 9/2016 Strohmenger ......... G06Q 10/06
2017/0032589 A1 2/2017 Zagajac et al. .............. 701/29.3
2017/0103587 A1* 4/2017 Oberschachtsiek .... G07C 5/008
2018/0217110 A1* 8/2018 Owens ............... G01N 29/2481
2019/0166097 A1* 5/2019 Renpenning et al. ....................... H04L 63/0245
2019/0324743 A1* 10/2019 Sajadi ....................... G06F 8/71
2020/0410135 A1* 12/2020 Macey ............. G06F 18/23213

FOREIGN PATENT DOCUMENTS

CN 105022911 A 11/2015 ............. G06F 19/00
CN 107070768 A 8/2017 ............. H04L 12/58
DE 102010029952 A1 12/2011 ............. G05B 19/04
DE 102011106295 A1 1/2012 ............... G08G 1/01
DE 102012012668 A1 1/2013 ............ G06Q 50/10
DE 102014206545 A1 10/2015 ............... G08G 1/01
DE 102014213984 A1 1/2016 ............. B60R 16/02
DE 102015219783 B3 12/2016 .............. H04W 4/02
DE 102015213393 A1 1/2017 ............... G08G 1/01
DE 102016113038 A1 2/2017 ............... G07C 5/00
DE 102018220993 A1 6/2020 ............. H04L 12/24
FI 20030745 A 11/2004 ............. H04L 29/06
GB 2562471 A 11/2018 ............... G06F 8/60
WO 2020/114712 A1 6/2020 ........... G05B 19/042

OTHER PUBLICATIONS

European Office Action, Application No. 19801549.7, 5 pages, Mar. 2, 2023.
Chinese Office Action, Application No. 201980080481.2, 22 pages, Nov. 20, 2023.

* cited by examiner

METHOD AND SYSTEM FOR PROVIDING DATA FOR AT LEAST ONE DATA RECEIVER

CROSS-REFERENCE TO RELATED APPLICATIONS

This application claims priority to German Patent Application No. DE 10 2018 220 993.6, filed on Dec. 5, 2018 with the German Patent and Trademark Office. The contents of the aforesaid Patent Application are incorporated herein for all purposes.

TECHNICAL FIELD

The invention relates to a method and a system for providing data for at least one data receiver.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

With the increasing use of sensors in daily life and increasing networking of electronic apparatuses, ever greater amounts of data are available that can be provided to data receivers for further evaluation and use. In particular, such data are captured, or respectively generated by functions in vehicles and smartphones and can in principle be supplied for further use.

A configuration of these functions that generate the data is currently however only unsatisfactorily resolved.

SUMMARY

An object exists to create a method and a system for providing data for at least one data receiver in which configuring a function that generates data can be performed better.

The object is solved by a method and a system having the features of the independent claims. Embodiments of the invention are discussed in the dependent claims and the following description.

DESCRIPTION

Figure 1:
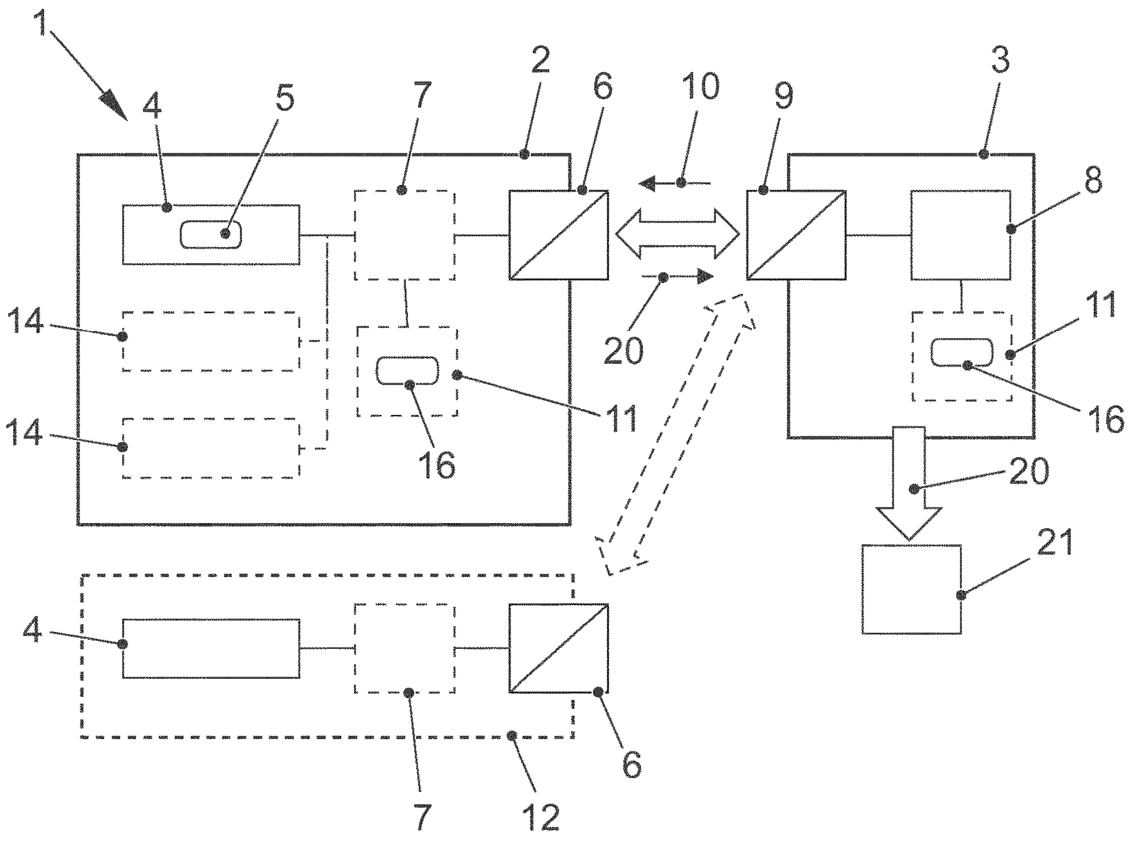
FIG. 1 shows a schematic representation of an embodiment of the system for providing data for at least one data receiver.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In one exemplary aspect, a method for providing data for at least one data receiver is provided, wherein the data are generated by means of at least one function of a data provision apparatus, wherein the at least one function can be configured on the basis of at least one configuration parameter, the method comprising the following steps: creating a configuration for the at least one function by specifying the at least one configuration parameter by means of a configuration apparatus of a backend server, transmitting the created configuration to the data provision apparatus by means of an interface of the backend server, receiving the configuration by means of an interface of the data provision apparatus, configuring the at least one function on the basis of the received configuration, providing the data generated by means of the configured at least one function via the interface of the data provision apparatus.

In a second exemplary aspect, a system is provided for providing data for at least one data receiver comprising at least one data provision apparatus, wherein the at least one data provision apparatus comprises at least one function for generating data, wherein the at least one function can be configured on the basis of at least one configuration parameter; and a backend server, wherein the backend server comprises a configuration apparatus and an interface, wherein the configuration apparatus is set up to create a configuration for the at least one function by specifying the at least one configuration parameter and to transmit it via the interface to the associated data provision apparatus, and wherein the data provision apparatus comprises an interface and is set up to receive the configuration via the interface, to configure the at least one function on the basis of the received configuration, and to provide the data generated by means of the configured function via the interface.

A basic idea of the teachings herein is to perform a configuration of a function of a data provision apparatus by means of a backend server, and to transmit the created configuration to the data provision apparatus. In the data provision apparatus, the function is then adjusted, or respectively configured corresponding to the transmitted configuration. The configuration of the at least one function is transmitted in this case via an interface that is unified for all data provision apparatuses, or respectively their functions, that are provided in the system. All of the functions that exist in the system can then be configured via the backend server.

The benefit is that the configuration of the at least one function can be designed to be much more flexible. In particular, configurations can be flexibly specified, or respectively modified. The provision of data for the at least one data receiver can therefore be carried out in an improved manner. The method and the system offer the benefit that a plurality of different functions may be combined into a system in different data provision apparatuses. An adaptation of a configuration of a function, for example to modified legal specifications, may also be performed with greater facility.

A function that can also be termed a service should in particular be able to capture data, or respectively generate and provide data. Examples of a function are data capturing, for example position capturing, speed capturing, measured value capturing, etc. A function in some embodiments may however also be a saving function to save data. Functions can also be designed to be more complex; accordingly, a function in some embodiments may for example also perform calculations or merge or combine several data or measured values. If the data provision apparatus is a vehicle, the function in some embodiments may also be a data request on a bus system (such as a CAN bus) of the vehicle; the function then serves as a gateway to the bus system. A function in some embodiments may be configured by at least one configuration parameter, wherein the at least one function parameter determines a functioning of the function. A configuration parameter is for example a frequency with which measured data are captured, or with which data are provided to a data receiver (such as once per minute, once per second, etc.). A configuration parameter is for example furthermore a setting of a sensor with which data are generated or captured. A configuration parameter in some embodiments may however also be a threshold value, for example for a speed above which the function is to provide data. Such a configuration parameter in some embodiments may also be a saving time for saving data by means of a function. Furthermore, a configuration parameter in some embodiments may also indicate whether data should be saved, or whether the data should be transmitted immediately.

A data provision apparatus may be a vehicle, a smartphone, or a control with which data can be generated and/or captured. A data provision apparatus may also be designed as a dongle that can generate and/or capture and provide data.

It may be provided in some embodiments that the at least one data provision apparatus has a control apparatus that coordinates communication via the interface and the configuration of the at least one function. In particular, the control apparatus configures the at least one function on the basis of the configuration received via the interface, for example in that the at least one configuration parameter of the at least one function is set corresponding to the configuration.

It may in some embodiments be provided that a data provision apparatus has more than only one function. These may be functions that are designed differently with respect to a functional scope. It may however also be provided that the functions are the same in terms of their structure, but have a different configuration, however, i.e., are operated with different configuration parameters.

The backend server does not have to be configured as a single, physically configured server. It may in some embodiments be provided that the backend server is configured in a cloud.

The interfaces in some embodiments may be configured both as hardware as well as software, or as a combination of hardware and software. For example, the interfaces should be suitable for providing a uniform and in particular generically useful communication channel through which different functions of different data provision apparatuses (vehicles, smartphones, dongles, embedded systems, controls, etc.) may be configured. For example, metadata may also be transmitted via the interfaces that uniformly describe the at least one function with respect to a functional scope, and with respect to the at least one configuration parameter. Moreover, the generated data themselves are also transmitted via the interfaces in some embodiments. In this case, the interfaces function as a tunnel for transmitting the data invisible to the outside, for example from a data provision apparatus to a backend server.

In some embodiments, the at least one function is registered in the configuration apparatus of the backend server, wherein the associated at least one configuration parameter of the at least one function of the configuration apparatus is communicated within the context of the registration. This makes it possible to flexibly add functions to the system. If a new function is to be added, metadata of the new function that, e.g., include a functional scope and the at least one configuration parameter are transmitted to the configuration apparatus. All of the functions that are registered are then available for a configuration. For example, it may be provided that the data provision apparatus performs such a registration of a new function with the functional scope and the associated configuration parameters in the backend server, or respectively the configuration apparatus of the backend server, or requests a registration therein. Given the option of a registration, new functions may be easily added, and functions that are no longer needed or no longer desired can be deleted.

In some embodiments, a configuration of the at least one function is requested by the data provision apparatus from the backend server. This may for example occur when a function is used the first time in the at least one data provision apparatus. The at least one data provision apparatus then requests a configuration for this function from the backend server. If the function is for example a capturing of measured data and the configuration parameter of this function is a capture frequency, at least this frequency is requested as a configuration from the backend server.

In some embodiments, a checking apparatus checks whether the created configuration, and/or whether the provision of data to the at least one data receiver, is permissible during or after creating the configuration for the at least one function.

The checking may in some embodiments occur after the creation of the configuration for the at least one function in the backend server. In this case, the backend server comprises a checking apparatus. While checking, in particular specifications are taken into account with respect to a type and a scope of the data provided after the configuration of the at least one function. For example, it is checked whether the data that provide the at least one function after the configuration are allowed to leave the data provision apparatus and be transmitted to the at least one data receiver. Despite the provided flexibility when providing and configuring the at least one function, this can ensure data protection by "privacy by design".

In addition or alternatively and in some embodiments, the checking may also occur in the data provision apparatus. In this case, the data provision apparatus comprises a checking apparatus. This can be done both before configuring the at least one function as well as after configuring the at least one function. Checking after the configuration makes it possible to check the configuration with respect to its permissibility at any point in time. For example, this also allows changing conditions to be taken into account, such as changed specifications or restrictions with respect to the data that a function is allowed to provide. This allows data protection to be ensured much more effectively.

Several checking apparatuses may also be provided in some embodiments. These may be designed in the same way or differently, both with respect to the functions as well as checking content.

Checking makes it possible to provide a plurality of different data receivers with tailored data in a manner compliant with data protection. This improves the provision of the data. In doing so, the system provides a type of guardian function so that only data are transmitted to a data receiver that are also provided for this purpose.

In doing so, before the provision of data to a data receiver, the at least one function poses a query as to whether this data may be provided to this data receiver. The query is in particular processed and answered by a control apparatus of the data provision apparatus. Only when this request shows that the function may provide these data to the data receiver are the data transmitted to the data receiver. Otherwise, the provision of the data is blocked.

Some embodiments provide that the permissibility is checked based on a user preference. For example, a user preference, for example in the form of a user profile, will be or is saved in the checking apparatus. The user preference specifies for example which data the user is ready to provide. If a provision apparatus is for example a vehicle and an associated function provides for example position data of the vehicle as data for a data receiver, the user preference may provide that only position data with an age of one week are provided so that a current location of the vehicle cannot be determined therefrom. The user profile may also vary depending on the data receiver; for example, different user preferences can be saved in the form of receiver-dependent user profiles for different data receivers, or different types or classes of data receivers. In the above example of provided position data of the vehicle, for example only older position data may be provided to a commercial service, but current position data may however also be provided to a vehicle owner. The user preference may also comprise legal or country-specific specifications.

In some embodiments, the data provided by means of the at least one function can be anonymized before being provided. For example, anonymized position data may be provided from a plurality of data provision apparatuses such as vehicles to a traffic management system as the data receiver in order to thereby improve for example congestion detection. Anonymization can be performed by an anonymizing apparatus of the data provision apparatus. This removes individualizing information from the provided data.

In some embodiments, the created configuration is encoded and/or signed before transmission. This increases the security while transmitting the configuration. To accomplish this, a separate encoding and/or signing apparatus may be provided in some embodiments. It may however also be provided in some embodiments that the interfaces perform the encoding and/or the signing.

In some embodiments, the at least one data receiver proposes a configuration for the at least one function. It may for example be provided that a potential data receiver poses a request for certain data to the backend server, such as position data from vehicles on a certain freeway section. The backend server may then generate a configuration for a correspondingly configured function and transmit it to the at least one data provision apparatus. If applicable, the permissibility of the proposed, or respectively requested configuration is checked.

In some embodiments, the provision of the data comprises forwarding the data via the backend server to the at least one data receiver. The provision of the data to the at least one data receiver may thereby be performed in a centralized manner.

Parts of the system may be formed individually or assembled as a combination of hardware and software in some embodiments, for example as programmed code that is executed in a micro-controller or a microprocessor.

In the following, the invention will be explained in greater detail based on further exemplary embodiments and with reference to the drawings.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

In FIG. 1, a schematic representation of an embodiment of the system 1 for providing data 20 for at least one data receiver 21 is shown. The system comprises a data provision apparatus 2 and a backend server 3.

The data provision apparatus 2 comprises a function 4 that for example generates and provides position data. This function 4 is for example implemented in a control configured therefor with a microcontroller as program code. The function 4 can be configured based on at least one configuration parameter 5. A configuration parameter 5 is for example a spatial resolution while positioning, a frequency with which a position is provided, or an age of the position data. The data provision apparatus 2 furthermore comprises an interface 6 and a control apparatus 7.

The backend server 3 comprises a configuration apparatus 8 and an interface 9. The configuration apparatus 8 creates a configuration for the function 4 of the data provision apparatus 2 by specifying the at least one configuration parameter 5, and transmits the created configuration 10 via the interface 9 to the data provision apparatus 2.

The data provision apparatus 2 receives the transmitted configuration 10 via the interface 6, and configures the function 4 based on the received configuration 10 by means of the control apparatus 7 that coordinates a communication via the interface 6 and performs the configuration of the function 4.

Then the data 20 generated by means of the function 4 configured in the configuration 10 are provided via the interface 6 of the data provision apparatus 2. The data 20 are forwarded via the backend server 3 to the at least one data receiver 21. The at least one data receiver 21 can then further process, for example evaluate for analysis, the transmitted data 20.

The system 1 enables the flexible configuration of a function 4 in a data provision apparatus 2. In particular, the function 4 can be reconfigured flexibly.

It may be provided that the data provision apparatus 2 comprises additional functions 14. These are then configured in the same way.

Furthermore, the system can also comprise other data provision apparatuses 12. The other data provision apparatuses are configured in principle like the data provision apparatus 2. A function 4 of the other data provision apparatus 12 is also configured as described by means of the configuration apparatus 8 of the backend server 3.

It may be provided that a function 4, 14 of the configuration apparatus 8 of the backend server 3 is registered, wherein a functional scope and the associated at least one configuration parameter 5 of the function 4, 14 of the configuration apparatus 8 is communicated in the context of registration. This is done in the form of metadata.

It may furthermore be provided that a configuration 10 of the function 4, 14 is requested by the data provision apparatus 2 from the backend server 3. This is accomplished in particular when the data provision apparatus 2 does not have a configuration 10 for the function 4, 14. Furthermore, this can also be accomplished at regular intervals, or for certain events. For example, a current configuration 10 can be requested from the backend server 3 each time the vehicle is started.

It may be provided that a checking apparatus 11 checks whether the created configuration 10 and/or whether the provision of data 20 to the at least one data receiver 21 is permissible during or after creating the configuration 10 for the function 4, 14. The checking apparatus 11 can be configured both in the data provision apparatus 2 as well as in the backend server 3.

In this case, it can be provided that the permissibility is checked based on a user preference 16. This user preference 16 is for example saved in the particular checking apparatus 11. The user preference 16 indicates in this case which data 20 a user has released, or respectively which data 20 may be provided according to the type and scope of the at least one data receiver 21. By checking based on the user preference 16, data protection specifications can be better taken into account within the framework of "privacy by design".

Moreover it can be provided that the data provided by means of the at least one function are anonymized before being provided. This is performed for example in the control apparatus 7 of the data provision apparatus 2. In this manner, for example data 20 from a plurality of data provision apparatuses 2, 12 can be provided as anonymized swarm data.

It can also be provided that the created configuration 10 is encoded and/or signed before transmission. To accomplish this, the backend server 3 comprises for example an encoding and signing apparatus (not shown). Complementary with this, the data provision apparatus 2, 12 comprises an associated decoding and signature checking apparatus (not shown).

It can furthermore be provided that the at least one data receiver 21 suggests a configuration 10 for a function 4, 14. In this case, the at least one data receiver 21 poses for example a request for data 20 that it wants to be provided. If functions 4, 14 are known to the at least one data receiver 21 in terms of their type and functional scope, it can specifically propose a configuration 10 for one of the functions 4, 14 that provide the desired data 20.

Figure 2:
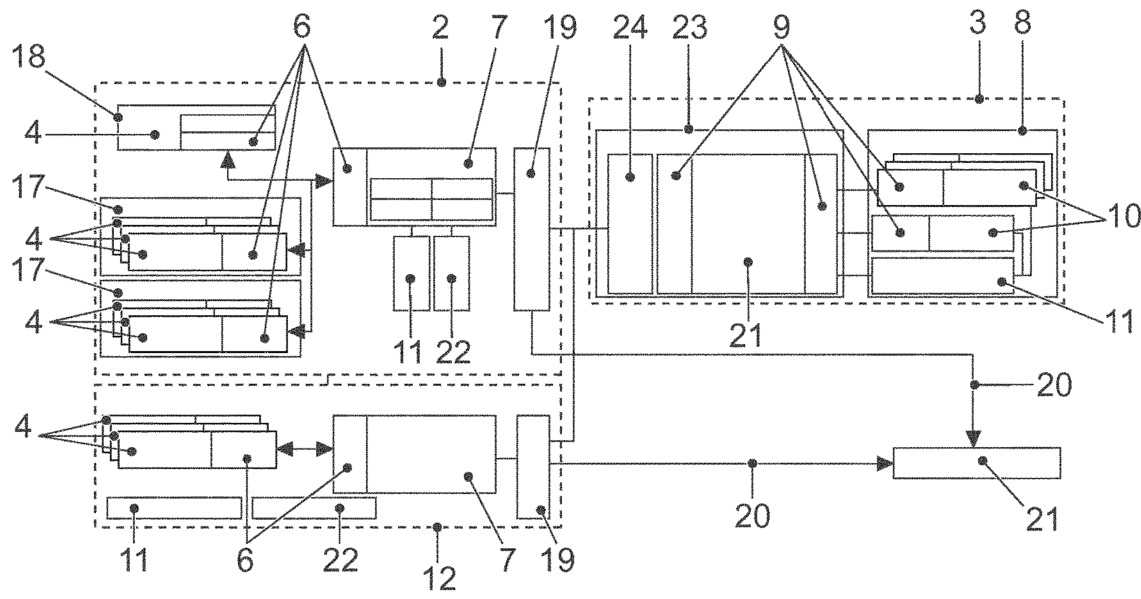
FIG. 2 shows a schematic representation of another embodiment of the system for providing data for at least one data receiver.

In FIG. 2, a schematic representation of another embodiment of the system 1 for providing data 20 for at least one data receiver 21 is shown. In the shown embodiment, the system 1 comprises a data provision apparatus 2 and another data provision apparatus 12. The data provision apparatus 2 is designed as a vehicle, and the other data provision apparatus 12 is designed as an app on a smartphone.

The data provision apparatus 2 designed as a vehicle comprises two control units 17 and a gateway 18 for a CAN bus of the vehicle. Each of the control units 17 and the gateway 18 comprises several functions 4. The functions 4 can communicate via an interface 6. A vehicle state can for example be requested via the functions 4 of the gateway 18. A function 4 of the gateway 18 can for example provide a state of a driver's door of the vehicle as data (such as "door open"/"door closed").

The data provision apparatus 12 designed as a smartphone comprises several apps that provide several functions 4. The functions 4 of the apps can communicate via an interface 6.

The data provision apparatuses 2, 12 furthermore each comprise a control apparatus 7 that coordinates communication via the interface 6 and controls configuration of the functions 4. Furthermore, the data provision apparatuses 2, 12 each comprise a checking apparatus 11 that checks based on a user preference whether configurations are permissible for the functions 4, and decoding apparatuses 22 for decoding encoded configurations 10.

Data between the data provision apparatuses 2, 12 and the backend server 3 are exchanged via connecting units 19 provided therefor.

The backend server 3 comprises a configuration apparatus 8 in which configurations 10 can be created for functions 4 registered therein of the data provision apparatuses 2, 12. Furthermore, the backend server 3 also comprises a checking apparatus 11 and a connection block 23 that has a connection unit 24 and an encoding and signing apparatus 21.

The configuration apparatus 8 and the connection block 23 communicate via an interface 9. The connection units 19, 24 communicate for example via the message queuing telemetry transport (MQTT) protocol and the hypertext transfer protocol (HTTP) protocol.

An exemplary process of the method will be described below with reference to the system 1 shown in FIG. 2.

First, the functions 4 are activated and are registered in the backend server 3. To accomplish this, for example a functional scope and at least one configuration parameter of the functions 4 are transmitted in the form of metadata via the interfaces 6, 9 to the configuration apparatus 8 of the backend server 3. The functions 4 are registered there based on the transmitted metadata, and the backend server 3, or respectively the configuration apparatus 8 then recognizes the functional scope and the configuration parameters of the registered functions.

If no configuration 10 can be provided for a function 4 in one of the data provision apparatuses 2, 12 from the particular control apparatus 7, a request is made to the configuration apparatus 8 of the backend server 3.

The configuration apparatus 8 then creates a configuration 10 based on the saved at least one configuration parameter of the corresponding function 4. The checking apparatus 11 of the backend server 3 checks based on a user preference whether the created configuration 10 is permissible. To accomplish this, it is checked in particular if a user has approved provision of the data 20 according to the configuration 10 of the function 4. To the extent that the created configuration 10 is permissible, the created configuration 10 is forwarded to the encoding and signing apparatus 21.

The configuration 10 is encoded and signed in the encoding and signing apparatus 21.

After the encoding and signing, the configuration 10 is for example transmitted in the form of an MQTT/HTTP message to the requesting data provision apparatus 2. The hardware transmits via the connection units 19, 24.

In the data provision apparatus 2, the received configuration 10 is decoded in the decoding apparatus 22 and checked for its signature. Then, based on a user profile, it can be rechecked by means of the checking apparatus 11 of the data provision apparatus 2 if the received configuration 10 is permissible.

The configuration 10 is then forwarded by the control apparatus 7 to the associated function 4, or respectively this function 4 is configured by the control apparatus 7 according to the configuration 10 by setting the configuration parameter(s) of the function 4.

The configured function 4 then generates data 20 according to the specifications of the configuration 10, and provides them via the interface 6 and the control apparatus 7 to the at least one data receiver 21. This can be done directly (see FIG. 2) or by forwarding via the backend server (not shown).

In doing so, before providing the data 20 generated by the function 4, the checking apparatus 11 can recheck whether the data 20 may or may not be provided according to the user preference. Only if these data 20 may be provided are the data 20 forwarded to the at least one data receiver 21.

It can be provided that the functions 4 can also communicate with each other, for example in order to be able to provide a greater functional scope from combinations of measured values that were captured by means of different functions 4, or respectively were provided by the gateway 18.

LIST OF REFERENCE NUMERALS

1 System
2 Data provision apparatus
3 Backend server
4 Function
5 Configuration parameter
6 Interface
7 Control apparatus
8 Configuration apparatus
9 Interface
10 Configuration
11 Checking apparatus
12 Data provision apparatus
14 Other function
16 User preference
17 Control unit
18 Gateway
19 Connection unit
20 Data
21 Data receiver
29 Connection block
30 Connection unit The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments.

The mere fact that certain measures are recited in mutually different dependent claims or embodiments does not indicate that a combination of these measures cannot be used to advantage. Any reference signs in the claims should not be construed as limiting the scope.

What is claimed is:

1. A method of a backend server and a data provision apparatus for providing data for at least one data receiver, the data being generated by at least one function of the data provision apparatus, which at least one function can be configured on the basis of at least one configuration parameter, the method comprising:

creating a configuration for the at least one function by specifying the at least one configuration parameter by a configuration device of the backend server;

transmitting the created configuration to the data provision apparatus by an interface of the backend server;

receiving the configuration by an interface of the data provision apparatus;

configuring the at least one function on the basis of the received configuration; and providing the data generated by the configured at least one function via the interface of the data provision apparatus, wherein a checking apparatus is configured to, during or after creating the configuration for the at least one function, determine whether the created configuration, and/or whether the provision of data to the at least one data receiver, is permissible, wherein the permissibility is checked based on a user preference, wherein the data provided by the at least one function are anonymized before being provided.

2. The method of claim 1, wherein the at least one function is registered in the configuration apparatus of the backend server, wherein the associated at least one configuration parameter of the at least one function of the configuration apparatus is communicated within the context of the registration.

3. The method of claim 1, wherein a configuration of the at least one function is requested by the data provision apparatus from the backend server.

4. The method of claim 1, wherein the created configuration is encoded and/or signed before transmission.

5. The method of claim 1, wherein the at least one data receiver suggests a configuration for the at least one function.

6. The method of claim 1, wherein the provision of the data comprises forwarding the data via the backend server to the at least one data receiver.

7. A system comprising a backend server and a data provision apparatus for providing data for at least one data receiver including:

the at least one data provision apparatus, wherein the at least one data provision apparatus comprises at least one function for generating data, wherein the at least one function can be configured on the basis of at least one configuration parameter; and the backend server, wherein the backend server comprises a configuration apparatus and an interface, wherein the configuration apparatus is configured to create a configuration for the at least one function by specifying the at least one configuration parameter, and to transmit it via the interface to the associated data provision apparatus, and wherein the data provision apparatus comprises an interface and is configured to receive the configuration via the interface to configure the at least one function on the basis of the received configuration, and to provide the data generated by the configured function via the interface, wherein a checking apparatus is configured to, during or after creating the configuration for the at least one function, determine whether the created configuration, and/or whether the provision of data to the at least one data receiver, is permissible, wherein the permissibility is checked based on a user preference, wherein the data provided by the at least one function are anonymized before being provided.

8. The method of claim 2, wherein a configuration of the at least one function is requested by the data provision apparatus from the backend server.

9. The method of claim 2, wherein the created configuration is encoded and/or signed before transmission.

10. The method of claim 1, wherein transmitting the created configuration to the data provision apparatus by an interface of the backend is when the checking apparatus determines the created configuration, and/or whether the provision of data to the at least one data receiver, is permissible.

* * * * *